(12) United States Patent
Melzer et al.

(10) Patent No.: US 10,969,463 B2
(45) Date of Patent: Apr. 6, 2021

(54) RADAR SENSING WITH INTERFERENCE SUPPRESSION

(71) Applicant: Infineon Technologies AG, Neubiberg (DE)

(72) Inventors: Alexander Melzer, Neutillmitsch (AT); Mario Huemer, Alkoven (AT); Paul Meissner, Feldkirchen bei Graz (AT); Alexander Onic, Linz (AT); Rainer Stuhlberger, Puchenau (AT); Fisnik Sulejmani, Linz (AT); Matthias Wagner, Engerwitzdorf (AT)

(73) Assignee: Infineon Technologies AG, Neubiberg (DE)

( * ) Notice: Subject to any disclaimer, the term of this patent is extended or adjusted under 35 U.S.C. 154(b) by 223 days.

(21) Appl. No.: 16/157,252

(22) Filed: Oct. 11, 2018

(65) Prior Publication Data

US 2019/0113600 A1   Apr. 18, 2019

(30) Foreign Application Priority Data

Oct. 13, 2017   (DE) .......................... 102017123892.1
Sep. 24, 2018   (DE) .......................... 102018123383.3

(51) Int. Cl.
*G01S 7/02*   (2006.01)
*G01S 13/34*   (2006.01)
(Continued)

(52) U.S. Cl.
CPC ............ *G01S 7/023* (2013.01); *G01S 13/343* (2013.01); *G01S 13/584* (2013.01); *G01S 13/931* (2013.01)

(58) Field of Classification Search
None
See application file for complete search history.

(56) References Cited

U.S. PATENT DOCUMENTS 3,995,270 A * 11/1976 Perry .................... G01S 7/2922
342/93
4,489,319 A * 12/1984 Hansen ................ G06K 9/3241
342/194

(Continued)

FOREIGN PATENT DOCUMENTS

DE   102013210256   12/2014
EP      3165941 A1    5/2017

(Continued)

OTHER PUBLICATIONS

R. Schafer, "What is a Savitzky-Golay Filter?"; IEEE Signal Processing Magazine; vol. 24, issue 4; Jul. 2011; pp. 111-117; IEEE, Piscataway, New Jersey, USA. (Year: 2011).*

(Continued)

*Primary Examiner* — Bernarr E Gregory
(74) *Attorney, Agent, or Firm* — Harrity & Harrity, LLP

(57) ABSTRACT

A method for processing radar data is described herein. In accordance with one embodiment, the method includes the calculation of a Range Map based on a digital radar signal received from a radar receiver. The Range Map includes spectral values for a plurality of discrete frequency values and a plurality of discrete time values, wherein each spectral value is represented by at least a first parameter. Further, the method includes applying an operation to at least the first parameters in the Range Map for at least one discrete frequency value to smooth or analyze at least a portion of the Range Map.

23 Claims, 8 Drawing Sheets

(51) Int. Cl.
*G01S 13/58* (2006.01)
*G01S 13/931* (2020.01)
*G01S 13/00* (2006.01)

(56) References Cited

U.S. PATENT DOCUMENTS

| | | | | |
|---|---|---|---|---|
| 4,887,088 | A * | 12/1989 | Beckett | G01S 13/341 342/128 |
| 5,319,583 | A * | 6/1994 | Wildes | G01D 1/16 708/207 |
| 5,416,488 | A * | 5/1995 | Grover | G01S 7/2927 342/109 |
| 9,584,347 | B2 * | 2/2017 | Elenes | H04L 27/2605 |
| 2005/0165520 | A1 * | 7/2005 | Ariyur | G05B 23/0232 702/190 |

FOREIGN PATENT DOCUMENTS

| | | | | | |
|---|---|---|---|---|---|
| EP | 3270180 | A1 * | 1/2018 | | G01S 13/343 |
| GB | 2141302 | A * | 12/1984 | | G01S 13/534 |
| GB | 2197148 | A * | 5/1988 | | G01S 13/522 |
| WO | WO 2008/040341 | A1 | 4/2008 | | |

OTHER PUBLICATIONS

C. Ilioudis, "Introduction to Radar Signal Processing"; University of Strathclyde; Glasgow, United Kingdom; retrieved from the Internet on Jul. 15, 2020. (Year: 2020).*

"Range-Doppler Response"; no author listed; retrieved from the Internet at mathworks.com on Jul. 15, 2020. (Year: 2020).*

D. Koks, "How to Create and Manipulate Radar Range-Doppler Plots"; Defence Science and Technology Organisation (DTSO), Edinburgh, South Australia, Australia; Dec. 2014. (Year: 2014).*

\* cited by examiner (b)

(a)    (a)

- - - - → target          ⎯⎯→ target and interferer
- · - · → interferer       ⇒ target with interference suppression

RADAR SENSING WITH INTERFERENCE SUPPRESSION

RELATED APPLICATIONS

This application claims priority under 35 U.S.C. § 119 to German Patent Application No. 102017123892.1, filed on Oct. 13, 2017, and German Patent Application No. 102018123383.3, filed on Sep. 24, 2018, the contents of which are incorporated by reference herein in their entirety.

TECHNICAL FIELD

The present disclosure relates to the field of radar sensors and, in particular, to radar sensing techniques with interference suppression.

BACKGROUND

Radar sensors can be found in numerous sensing applications in which distances and velocities of objects are to be measured. In the automotive sector, there is an increasing demand for radar sensors that may be used in so-called advanced driver-assistance systems (ADAS). Examples of an advanced driver assistive system are "adaptive cruise control" (ACC) and "radar cruise control" systems. Such systems may be used to automatically adjust the speed of an automobile so as to maintain a safe distance from other automobiles driving ahead. Another example of an advanced driver assistive system are blind-spot monitors, which may employ radar sensors to detect other vehicles in the blind spot of a vehicle. Particularly autonomous cars may use numerous sensors, such as radar sensors, to detect and locate various objects in their surroundings. Information about the position and velocity of objects in the area of an autonomous car is used to help navigate safely.

Modern radar systems make use of highly integrated radio frequency (RF) circuits which may incorporate all core functions of an RF font-end of a radar transceiver in one single package (single chip transceiver). Such RF front-ends usually include, inter alia, a local RF oscillator (LO), power amplifiers (PA), low-noise amplifiers (LNA), and mixers. Frequency-modulated continuous-wave (FMCW) radar systems use radar signals whose frequency is modulated by ramping the signal frequency up and down. Such radar signals are often referred to as "chirp signals" or simply as chirps. A radar sensor usually radiates sequences of chirps using one or more antennas, and the radiated signal is backscattered by one or more objects (referred to as radar targets) located in the "field of view" of a radar sensor. The backscattered signals (radar echoes) are received and processed by the radar sensor. The detection of the radar targets is usually accomplished using digital signal processing.

As more and more automobiles are being equipped with radar sensors, interference is becoming an issue. That is, the radar signal radiated by a first radar sensor (installed in one automobile) may intersperse to the reception antenna of a second radar sensor (installed in another automobile) and impair the operation of the second radar sensor.

SUMMARY

A method for processing radar data is described herein. In accordance with one embodiment, the method includes the calculation of a Range Map based on a digital radar signal received from a radar receiver. The Range Map includes spectral values for a plurality of discrete frequency values and a plurality of discrete time values, wherein each spectral value is represented by at least a first parameter. Further, the method includes a smoothing of at least the first parameters in the Range Map for at least one discrete frequency value.

In accordance with another embodiment, the method includes the calculation of a Range Map based on a digital radar signal received from a radar receiver. The Range Map includes spectral values for a plurality of discrete frequency values and a plurality of discrete time values, wherein each spectral value is represented by at least a first parameter. Further, the method includes applying an operation to at least the first parameters in the Range Map for at least one discrete frequency value. Moreover, a Range/Doppler Map is calculated based on the Range Map, and a radar target detection is done based on the Range/Doppler Map and using the result(s) of the operation.

Furthermore, a radar device is described herein. In accordance with one embodiment, the radar device includes a radar receiver configured to provide a digital radar signal and a processor. In this embodiment, the processor is configured to calculate a Range Map based on the digital radar signal, wherein the Range Map includes spectral values for a plurality of discrete frequency values and a plurality of discrete time values; each spectral value is represented by at least a first parameter. Further, the processor is configured to smooth, for at least one discrete frequency value, at least the first parameters in the Range Map.

In accordance with another embodiment, the radar device includes a radar receiver configured to provide a digital radar signal and a processor. In this embodiment, the processor is configured to calculate a Range Map based on the digital radar signal, wherein the Range Map includes spectral values for a plurality of discrete frequency values and a plurality of discrete time values; each spectral value is represented by at least a first parameter. Further, the processor is configured to apply, for Range Map values corresponding to at least one discrete frequency value, an operation to at least the first parameters in the Range Map, to calculate a Range/Doppler Map based on the Range Map, and to perform radar target detection based on the Range/Doppler Map and using the result(s) of the operation.

BRIEF DESCRIPTION OF THE DRAWINGS

The present disclosure can be better understood with reference to the following drawings and descriptions. The components in the figures are not necessarily to scale; instead emphasis is placed upon illustrating the principles of the present disclosure. In the figures, like reference numerals designate corresponding parts. In the drawings.

DETAILED DESCRIPTION

Figure 1:
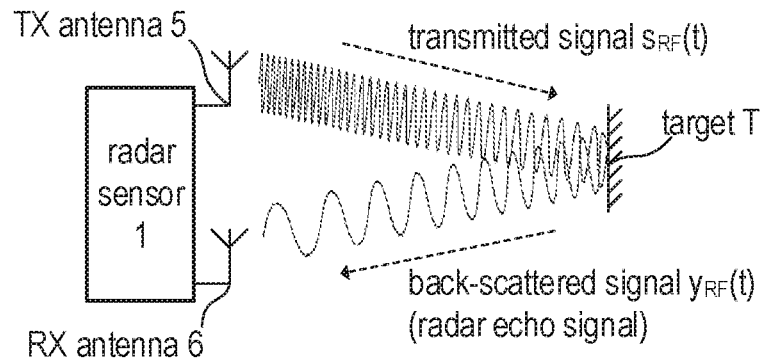
FIG. 1 is a sketch illustrating the operating principle of an FMCW radar system for distance and/or velocity measurement.

FIG. 1 illustrates a frequency-modulated continuous-wave (FMCW) radar sensor 1. In the present example, separate transmission (TX) and reception (RX) antennas 5 and 6, respectively, are used (bistatic or pseudo-monostatic radar configuration). However, it is noted that a single antenna can be used, so that the reception antenna and the transmission antenna will be physically the same (monostatic radar configuration). The transmission antenna 5 continuously radiates an RF signal $s_{RF}(t)$, which is frequency-modulated, for example, by a sawtooth signal (periodic linear ramp signal). The radiated signal $s_{RF}(t)$ is back-scattered at an object T, which is located in the radar channel within the measurement range of the radar device, and the back-scattered signal $y_{RF}(t)$ is received by the reception antenna 6. The object T is usually referred to as radar target. In a more general example, more than one target may be in the field of view of a radar sensor, and an antenna array may be used instead of a single RX antenna. Similarly, an antenna array may be used instead of a single TX antenna. Using antenna arrays allows for the measurement of the angle of incidence of a radar echo, usually referred to as direction of arrival (DoA). Measurement of the direction of arrival is important for many applications, and thus most radar sensors will make use of antenna arrays. To keep the drawings simple, only one TX antenna and one RX antenna are shown in the figures. It is understood that the concepts described herein are readily applicable to radar sensors with antenna arrays.

Figure 2:
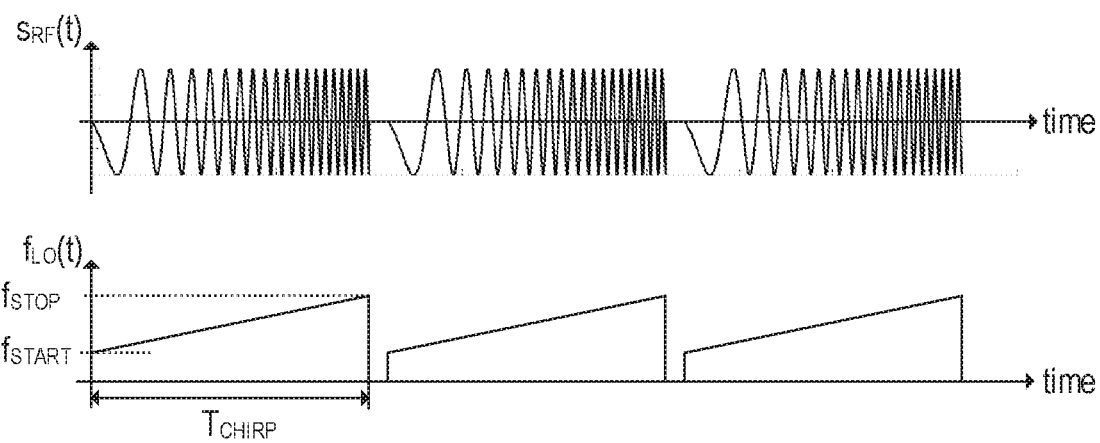
FIG. 2 includes two timing diagrams illustrating the frequency modulation of the RF signal used in FMCW radar systems.

FIG. 2 illustrates the mentioned frequency-modulation of the signal $s_{RF}(t)$. As shown in the first diagram of FIG. 2, the signal $s_{RF}(t)$ is composed of a series of "chirps", i.e. a sinusoidal waveform with increasing (up-chirp) or decreasing (down-chirp) frequency. In the present example, the instantaneous frequency $f_{LO}(t)$ of a chip increases linearly from a start frequency $f_{START}$ to a stop frequency $f_{STOP}$ within a defined time span $T_{CHIRP}$ (see second diagram of FIG. 2). Such a chirp is also referred to as a linear frequency ramp. Three identical linear frequency ramps are illustrated in FIG. 2. It is noted, however, that the parameters $f_{START}$, $f_{STOP}$, $T_{CHIRP}$ as well as the pause between the individual frequency ramps may vary dependent on the actual implementation of the radar device 1. In practice, the frequency variation may be, for example, linear (linear chirp, frequency ramp), exponential (exponential chirp) or hyperbolic (hyperbolic chirp).

Figure 3:
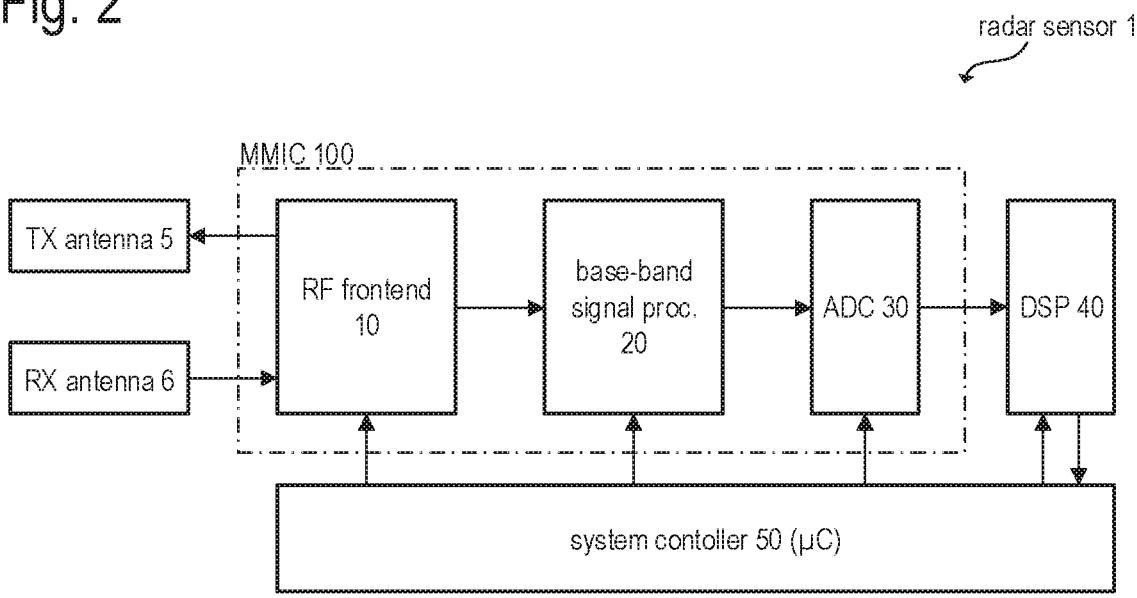
FIG. 3 is a block diagram illustrating the basic structure of an FMCW radar device.

FIG. 3 is a block diagram that illustrates an example structure of radar sensor 1. Accordingly, at least one transmission antenna 5 (TX antenna(s)) and at least one reception antenna 6 (RX antenna(s)) are connected to an RF frontend 10, which may be integrated in a semiconductor chip, usually referred to as monolithic microwave integrated circuit (MMIC). The RF frontend 10 may include all the circuit components needed for RF signal processing. Such circuit components may include, for example, a local oscillator (LO), RF power amplifiers, low noise amplifiers (LNAs), directional couplers such as rat-race-couplers and circulators, and mixers for the down-conversion of RF signals (e.g. the received signal $y_{RF}(t)$, see FIG. 1) into the base-band or IF-band. As mentioned, antenna-arrays may be used instead of single antennas. The depicted example shows a bistatic (or pseudo-monostatic) radar system, which has separate RX and TX antennas. In case of a monostatic radar system, a single antenna or a single antenna array may be used for both, receiving and transmitting electromagnetic (radar) signals. In this case a directional coupler (e.g. a circulator) may be used to separate RF signals to be transmitted to the radar channel from RF signals received from the radar channel.

In the case of a frequency-modulated continuous-wave (FMCW) radar sensor, the RF signals radiated by the TX antenna 5 may be in the range between approximately 20 GHz (e.g. 24 GHz) and 81 GHz (e.g. about 77 GHz in automotive applications). As mentioned, the RF signal received by the RX antenna 6 includes the radar echoes, i.e. the signals that have been back-scattered at the radar target(s). The received RF signal $y_{RF}(t)$ is down-converted into the base band and further processed in the base-band using analog signal processing (see FIG. 3, base-band signal processing chain 20), which basically includes filtering and amplification of the base-band signal. The base-band signal is finally digitized using one or more analog-to-digital converters 30 and further processed in the digital domain (see FIG. 3, digital signal processing chain implemented, e.g., in digital signal processor 40). The overall system is controlled by a system controller 50, which may be at least partly implemented using a processor executing appropriate firmware. The processor may be included, e.g. in a microcontroller a digital signal processor, or the like. The digital signal processor 40 (DSP) may be part of the system controller 50 or separate therefrom. The RF frontend 10 and the analog base-band signal processing chain 20 (and optionally the ADC 30) may be integrated in a single MMIC. However, the components may be distributed among two or more integrated circuits.

Figure 4:
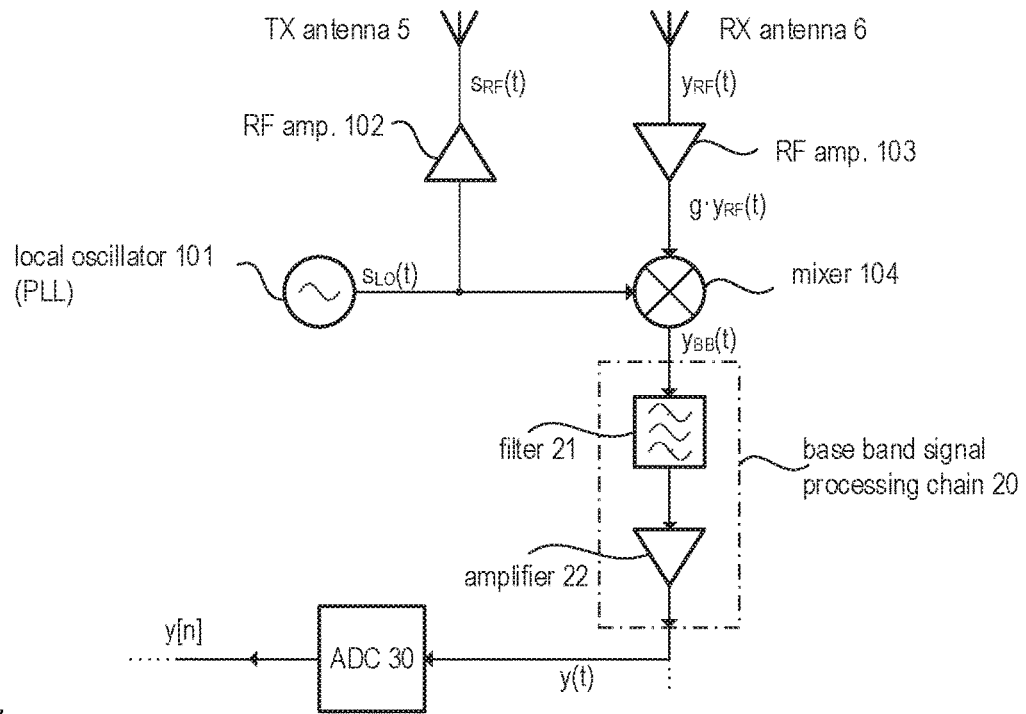
FIG. 4 is a circuit diagram illustrating one example of an analog RF frontend, which may be included in the FMCW radar device of FIG. 3.

FIG. 4 illustrates one example implementation of the RF frontend 10, which may be included in the radar sensor shown in FIG. 3. It is noted that FIG. 4 is a simplified circuit diagram illustrating the basic structure of an RF frontend. Actual implementations, which may heavily depend on the application, are of course more complex. The RF frontend 10 includes a local oscillator (LO) 101 that generates a RF signal $s_{LO}(t)$, which may be frequency-modulated as explained above with reference to FIG. 2. The signal $s_{LO}(t)$ is also referred to as LO signal). In radar applications, the LO signal is usually in the SHF (Super High Frequency) or the EHF (Extremely High Frequency) band, e.g. between 76 GHz and 81 GHz in automotive applications.

The LO signal $s_{LO}(t)$ is processed in the transmit signal path as well as in the receive signal path. The transmit signal $s_{RF}(t)$, which is radiated by the TX antenna 5, is generated by amplifying the LO signal $s_{LO}(t)$, e.g., using an RF power amplifier 102. The output of the amplifier 102 is coupled to the TX antenna 5 e.g. via strip lines, a coupler, matching network, etc. The received signal $y_{RF}(t)$, which is provided by the RX antenna 6, is provided to a mixer 104. In the present example, the received signal $y_{RF}(t)$ (i.e. the antenna signal) is pre-amplified by RF amplifier 103 (e.g. a low-noise amplifier with gain g), so that the mixer receives the amplified signal $g \cdot y_{RF}(t)$ at its RF input. The mixer 104 further receives the LO signal $s_{LO}(t)$ at its reference input and is configured to down-convert the amplified signal $g \cdot y_{RF}(t)$ into the base band. The resulting base-band signal at the mixer output is denoted as $y_{BB}(t)$. The base-band signal $y_{BB}(t)$ is further processed by the analog base band signal processing chain 20 (see also FIG. 3), which basically includes one or more filters (e.g. a band-pass 21) to remove undesired side bands and image frequencies as well as one or more amplifiers such as amplifier 22). The analog output signal, which may be supplied to an analog-to-digital converter (cf. FIG. 3) is denoted as y(t).

In the present example, the mixer 104 down-converts the RF signal $g \cdot y_{RF}(t)$ (amplified antenna signal) into the base band. The respective base band signal (mixer output signal) is denoted by $y_{BB}(t)$. The down-conversion may be accomplished in a single stage (i.e. from the RF band into the base band) or via one or more intermediate stages (from the RF band into an IF band and subsequently into the base band). The analog output signal y(t) may be digitized using analog-to-digital converter 30 (see FIG. 3, not shown in FIG. 4), and the respective digital output signal is denoted as y[n]. This signal is also referred to as digital radar signal.

Figure 5:
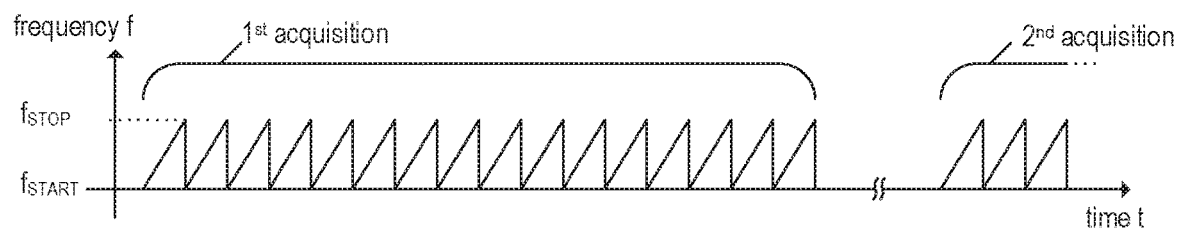
FIG. 5 is a timing diagram illustrating a sequence of chirps used for data acquisition in a radar sensor.
Figure 6:
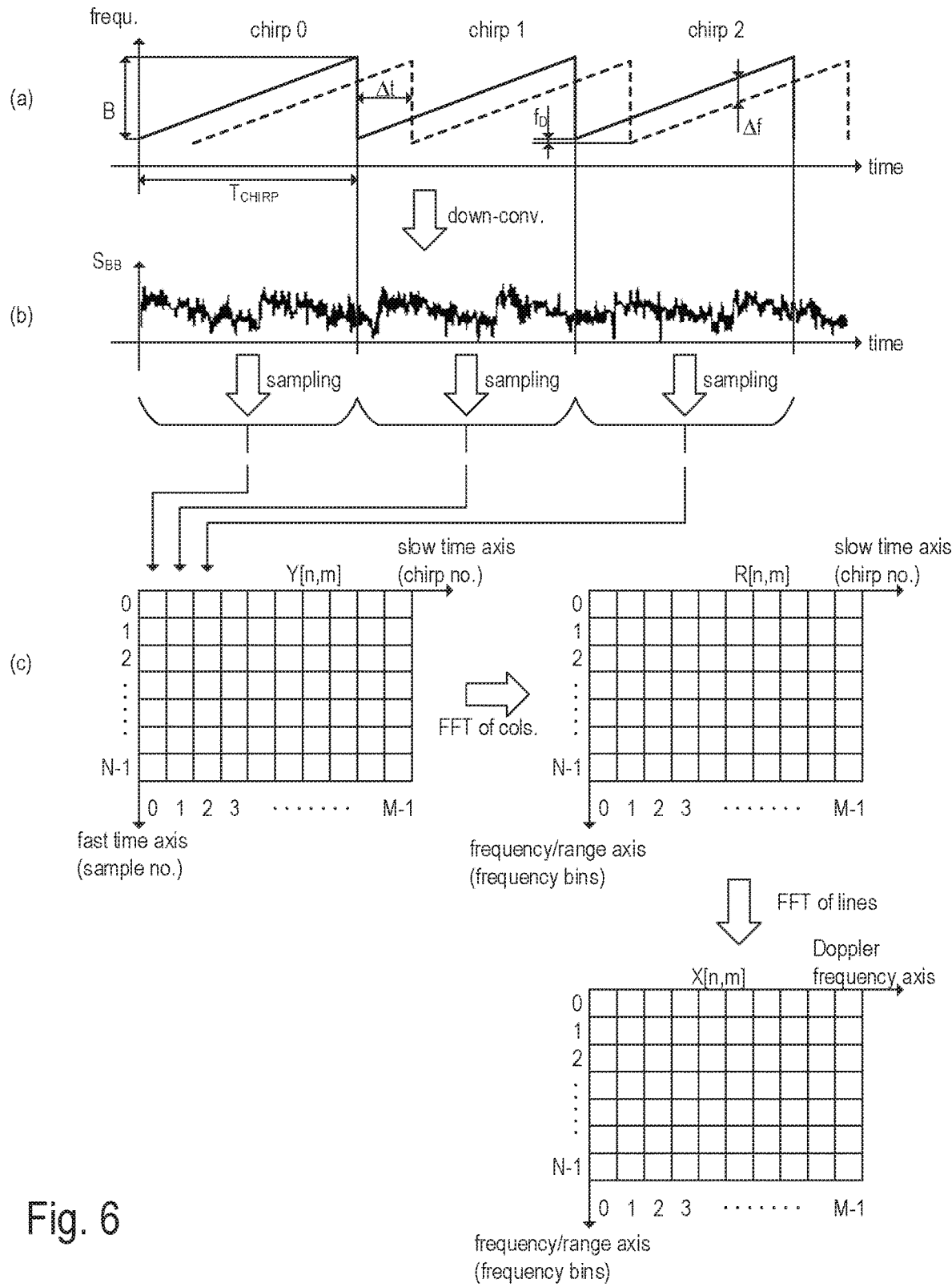
FIG. 6 illustrates the concept of Range Doppler Signal Processing commonly used in radar sensors.

FIG. 5 schematically illustrates an example FM scheme as is commonly implemented in FMCW radar sensors. In the depicted example, a sequence of sixteen up-chirps is transmitted for one data acquisition. It is noted that, in practice, a chirp sequence usually includes many more chirps (e.g. 256 chirps) and the present example has been simplified for illustration purposes only. In the embodiments described herein, the ramp parameters (start and stop frequency, steepness of frequency change, modulation pause before a chirp, etc.) that characterize the individual chirps of a chirp sequence are constant during a sequence. However, in some embodiments, the one or more of the ramp parameters may be varied between the chirps of a chirp sequence. One example signal processing method for evaluating the radar echoes is illustrated in FIG. 6. The depicted signal processing scheme is usually referred to as Range/Doppler processing and commonly used in radar sensors to detect radar targets in the range/velocity domain represented by a so-called Range/Doppler Map (see FIG. 6).

FIG. 6 illustrates the measurement principle used by a FMCW radar sensor that radiates a frequency modulated radar signal, which is modulated using a sawtooth-shaped modulation signal. Reference (a) of FIG. 6 illustrates frequency over time of an outgoing radar signal (solid line, cf. FIG. 4, signal $s_{RF}(f)$) and the respective incoming radar signal (dashed line, cf. FIG. 4, signal $y_{RF}(t)$). Accordingly, the frequency of the outgoing radar signal linearly increases from a start frequency $f_{START}$ to a stop frequency $f_{STOP}$ (chirp no. 0), then falls back to $f_{START}$ and again increases until the stop frequency $f_{STOP}$ is reached (chirp no. 1), and so on. As mentioned before with reference to FIG. 5, the outgoing radar signal is composed of a sequence of "frequency ramps" also referred to as "chirp pulses" or "chirps". Dependent on the application, a defined modulation pause may be inserted between two contiguous chirps, wherein the radar signal may remain at the stop frequency or the start frequency during the pause (or any frequency between stop and start frequency). The duration $T_{CHIRP}$ of one chirp may be in the range from a few microseconds up to a few milliseconds, e.g. 20 µs to 2000 µs. The actual values may be, however, greater or lower dependent on the application.

The incoming radar signal (received by an RX antenna) lags, with respect to the outgoing radar signal (radiated by the antenna), by a time lag $\Delta t$ due to the travel time of the radar signal from the TX antenna to the radar target (at which the radar signal is back-scattered) and back to the RX antenna. The time lag $\Delta t$ is often referred to as round trip delay RTD. The distance $d_T$ of the radar target from the radar sensor is $d_T = c \cdot \Delta t / 2$, i.e., the speed of light c times half of the time lag $\Delta t$. As can be seen from FIG. 6, reference (a), the time lag $\Delta t$ results in a frequency shift $\Delta f$, which can be determined by down-mixing the incoming signal (see FIG. 4, mixer 104, reference (b) of FIG. 6), digitizing the base-band signal, and performing a subsequent digital spectral analysis; the frequency shift appears as beat frequency in the base-band signal. When using a linear chirp (i.e. a sawtooth-shaped modulation signal) the time lag $\Delta t$ can be calculated as $\Delta t = \Delta f / k$, wherein the factor k is the steepness of the frequency ramp, which can be calculated as $k = (f_{STOP} - f_{START})/T_{CHIRP}$.

Although the basic operation principle of a FMCW radar sensor has been outlined above, it should be noted that more sophisticated signal processing may be applied in practice. In particular, an additional frequency shift $f_D$ of the incoming signal due to the Doppler effect may cause an error in the distance measurement, because the Doppler shift $f_D$ adds to the frequency shift $\Delta f$, which is due to the travel time $\Delta t$ (round trip delay RTD) of the radar signal, as explained above. Dependent on the application, the Doppler shift may also be estimated from the outgoing and incoming radar signals, whereas, in some applications, the Doppler shift may be negligible for distance measurement. This may, in particular, be the case when the chirp duration $T_{CHIRP}$ is short, so that the frequency shift $\Delta f$ will be high as compared with the Doppler shift $f_D$ for any distance within the measuring range of the radar sensor. In the present example, the frequency of the radar signal increases from $f_{START}$ to $f_{STOP}$, which results in a so-called "up-chirps". However, the same measurement techniques can be applied with "down-chirps", that is when the stop frequency $f_{STOP}$ is lower than the start frequency $f_{START}$ and the frequency decreases from $f_{START}$ to $f_{STOP}$ during a chirp. In some radar systems, the Doppler shift may be eliminated, when the distance is calculated based on an "up-chirp" and on a "down-chirp". Theoretically, the actual measured distance $d_T$ of a radar target can be calculated as the average of a distance value obtained from the up-chirp echo and a distance value obtained from the down-chirp echo; by means of the averaging the Doppler shift is cancelled out.

One example standard signal processing technique of digital FMCW radar signals (see FIG. 3, DSP 40) includes the calculation of Range-Doppler Maps (also referred to as Range-Doppler Images). Generally, linear FMCW radars obtain target information (i.e. distance, angle, and velocity of a radar targets) by transmitting a sequence of linear chirps and mixing (down-converting) the delayed echoes (see FIG. 4, signal $y_{RF}(t)$) from the targets with a copy of the transmitted signal (see FIG. 4, mixer 104) as illustrated in reference (b) of FIG. 6. The target range information (i.e. the distance between sensor and a radar target) can be extracted from the spectrum of this down-converted signal. A Range-Doppler map can be obtained, e.g., by a two-stage Fourier transformation as described below in more detail. Range-Doppler maps can be used as a basis for various target detection, identification and classification algorithms.

As indicated above, the distance $d_T$ of the radar target from the radar sensor may be calculated as $$d_T = c \cdot \Delta f \cdot T_{CHIRP}/(2 \cdot B), \qquad (1)$$

wherein $\Delta f$ denotes the beat frequency and B the bandwidth of the chirp ($B = |f_{STOP} - f_{START}|$). Accordingly, the basic signal processing of linear FMCW radar involves determining the beat frequency by spectral analysis. When the radar target is moving, the Doppler effect has to be considered in order to determine the radar target's velocity (relative to the radar sensor). This can be done based on the mentioned Range-Doppler maps, which can be calculated using so-called Range-Doppler Processing.

The common method for calculating the Range-Doppler maps includes two steps, wherein each step includes the calculation of several Fourier Transforms, usually implemented using a Fast Fourier Transform (FFT) algorithm. For the following example, it is assumed that the digital radar signal $y[n]$ provided by the ADC 30 (see FIG. 4) includes N×M samples representing M chirps, wherein each chirp is composed of N samples (sampling time interval $T_{SAMPLE}$). These N×M samples may be arranged in a two-dimensional array $Y[n, m]$ (see reference (c) of FIG. 6) with N lines and M columns. Each column of the array $Y[n, m]$ represents one chirp. The $n^{th}$ line of the array $Y[n, m]$ includes the $n^{th}$ sample of each chirp. The line index n may also be seen as discrete time values $n \cdot T_{SAMPLE}$ on a "fast" time axis. Similarly, the column index m (chirp number) may be seen as discrete time values $m \cdot T_{CHIRP}$ on a "slow" time axis.

In a first stage, a first FFT (usually referred to as Range FFT) is applied to each chirp. That is, the FFT is calculated for each one of the M columns of the array $Y[n, m]$. In other words, the FFT is applied to the matrix $Y[n, m]$ along the "fast" time axis. The resulting Fourier transforms can also be arranged in a two-dimensional array, referred to as Range Map $R[n, m]$, wherein the M columns include the Fourier transforms of the M chirps. Each one of the N lines includes the (complex valued) spectral values for a specific discrete frequency value (often referred to as frequency bin). The Range Map $R[n, m]$ is illustrated in reference (c) of FIG. 6. A radar echo from a target will result in a peak appearing at (or near) a specific frequency bin. Usually the peak will appear in all columns, i.e. in all (Fourier transformed) chirps. The frequency value of the frequency bin can be converted into range information, e.g. according to eqn. (1).

In a second stage, a second FFT (usually referred to as Doppler FFT) is applied to each one of the N lines of the Range Map $R[n, m]$. Each line includes the M spectral values of the M chirps for a specific frequency bin, wherein each frequency bin corresponds to a specific range/distance of a radar target. In other words, the FFT is applied to the Range Map $R[n, m]$ along the "slow" time axis. The resulting Fourier transforms can also be arranged in a two-dimensional array, referred to as Range/Doppler Map $X[n, m]$. A radar echo from a target will result in a peak appearing in a specific position of the Range/Doppler Map $X[n, m]$. The line number $n \in [0, \ldots, N-1]$ in which the peak appears represents the frequency bin, and the respective frequency value can be converted into range information, e.g. according to eqn. (1). The column number $m \in [0, \ldots, M-1]$ in which the peak appears represents the Doppler frequency (frequency shift due to the Doppler effect) that can be converted into velocity information. In the case of more than one RX antenna, a Range/Doppler Map $X_a[n, m]$ may be calculated for each antenna, wherein a denotes the index of the respective RX antenna (a=0, 1, . . . A−1, A denoting the number of RX antennas). The A Range/Doppler Maps $X_a[n, m]$ may be stacked to a three-dimensional array, sometimes referred to as "radar data cube". It is understood that the parameters N and M may be equal but, in general, will be different.

As mentioned the Range Maps $R[n, m]$, the Range-Doppler Maps $X[n, m]$ or the radar data cubes may be used as input data for various signal processing techniques to detect radar targets in the surrounding (field of view) of the radar sensor. For example, various peak detection algorithms are known to detect peaks (i.e. local maxima, FFT peaks) in the Range Map or the Range/Doppler Map caused by objects (radar targets) in the radar channel. That is, a target may be detected if a value in the Range Map or the Range Doppler Map exceeds a specific threshold. However, more complex detection algorithms may also be used. Additional signal processing steps are performed to obtain, from the detected FFT peaks, a list of radar targets.

As does any measured data, the spectral values in the Range/Doppler Maps include noise. Thus, the detectability of FFT peaks and the reliability of detected peaks depend on the noise floor. Various noise sources may contribute to the noise floor, particularly the phase noise of the local oscillator (see FIG. 4, oscillator 101). Another phenomenon that occurs when more radar sensors of the same or a similar type are operated in the same environment (e.g. the same portion of a road) is interference. In this case the signal received by the RX antenna(s) of a radar sensor not only includes radar echoes and noise, but also signals radiated by one or more other radar sensors operating in the same frequency range and interspersed to the RX antenna(s). When considering a specific radar sensor, any other radar sensor operated in the same environment is a potential interferer and the radar signals radiated by one or more interferers are referred to as interference signals. Interference signals received by the RF frontend of a radar sensor superpose on the radar echoes caused by real targets and may at least temporarily increase the overall noise floor to values so high that detection of radar targets becomes impossible or at least prone to error.

Figure 7:
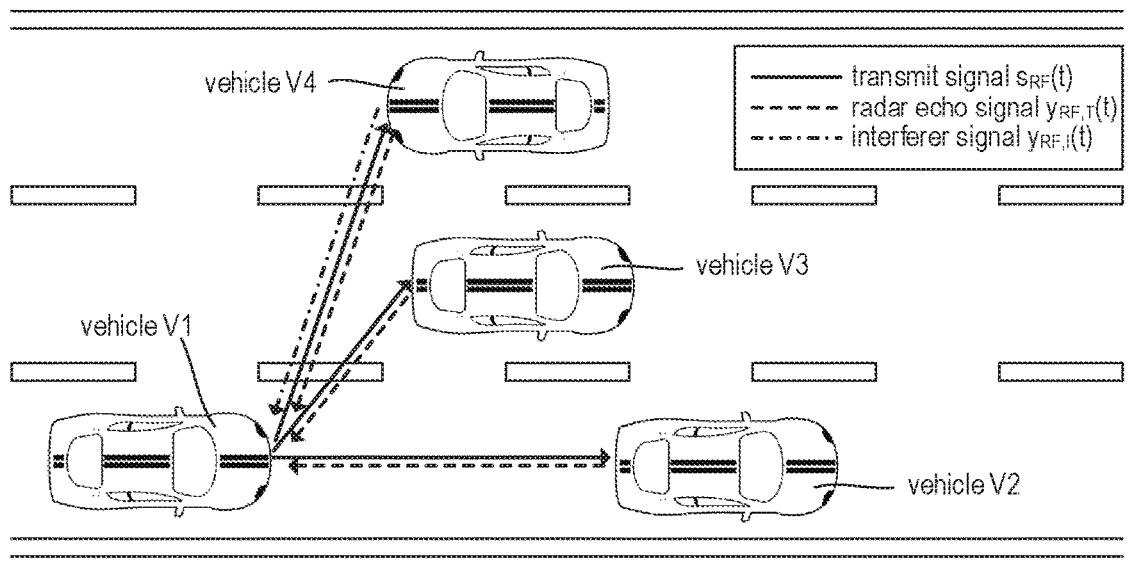
FIG. 7 illustrates one example of how interference is interspersed to the receiver of a radar sensor.

FIG. 7 illustrates one simple example showing how an interferer can disturb the received radar echoes. Accordingly, FIG. 7 illustrates a road with three lanes and four vehicles V1, V2, V3, and V4. At least vehicles V1 and V4 are equipped with a radar sensor. The radar sensor of vehicle V1 radiates an RF radar signal $s_{RF}(t)$ and the received signal $y_{RF}(t)$ includes the radar echoes back-scattered form the vehicles V2 and V3 driving ahead as well as from the vehicle V4 of the approaching traffic. Further, the signal $y_{RF}(t)$ received by the radar sensor of vehicle V1 includes a radar signal (interference signal) radiated by the radar sensor of approaching vehicle V4 (which is an interferer for the radar sensor of vehicle V1).

The signal $y_{RF}(t)$ received by the radar sensor of vehicle V1 may be written as $$y_{RF}(t) = y_{RF,T}(t) + y_{RF,I}(t), \text{ wherein} \qquad (2)$$

$$y_{RF,T}(t) = \sum_{i=0}^{U-1} A_{T,i} \cdot s_{RF}(t - \Delta t_{T,i}) \text{ and} \qquad (3)$$

$$y_{RF,I}(t) = \sum_{i=0}^{V-1} A_{I,i} \cdot s_{RF,i}'(t - \Delta t_{I,i}). \qquad (4)$$

In the above equations (2) to (4), the signals $y_{RF,T}(t)$ and $y_{RF,I}(t)$ are the signal components of the received signal $y_{RF}(t)$ due to real radar targets and, respectively, due to interference. In practice, more than one radar echo and more than one interferer may be present. Equation (3) represents the sum of the radar echoes caused by U different radar targets, wherein $A_{T,i}$ is the attenuation of the radar signal and $\Delta t_{T,i}$ the round trip delay caused by the $i^{th}$ radar target. Similarly, eqn. (4) represents the sum of the interference signals caused by V interferers, wherein $A_{I,i}$ denotes the attenuation of the radiated interference signal $s_{RF,i}'(t)$ and $\Delta t_{I,i}$ the associated delay (for each interferer i=0, 1, ... V−1). It is noted that the radar signal $s_{RF}(t)$ radiated by the radar sensor of vehicle V1 and the interfering radar signal $s_{RF,0}'(t)$ (interference signal, index i=0) radiated, e.g. by the radar sensor of vehicle V4 generally will include different chirp sequences with different chirp parameters (start/stop frequencies, chirp durations, repetition rates, etc.). It is noted that the amplitude of the signal component $y_{RF,I}(t)$ due to interference is usually significantly higher than the amplitude of the signal component $y_{RF,T}(t)$ due to the radar echoes.

Figure 8:
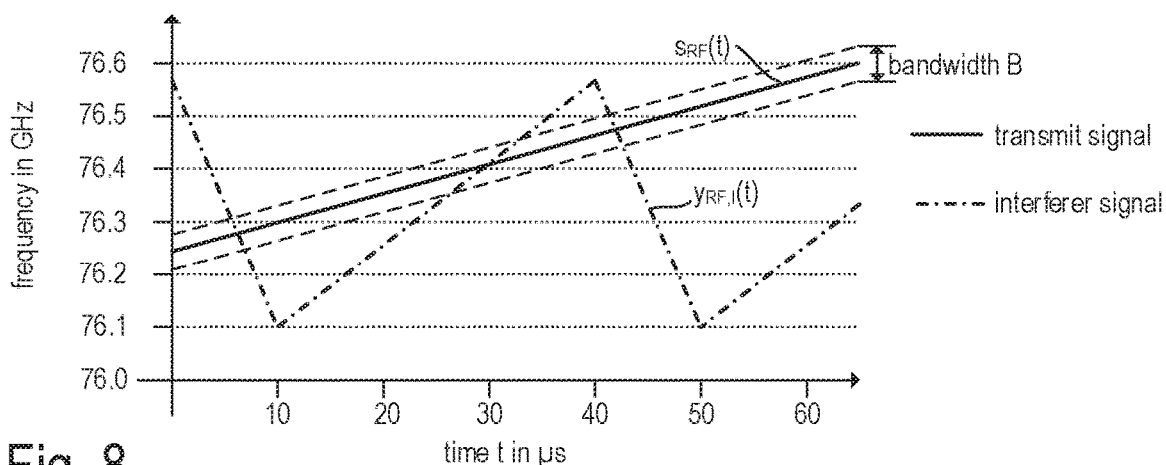
FIG. 8 illustrates, in a timing diagram, a transmit signal of a radar sensor and an interference signal from an interferer, wherein frequency-over-time waveform of these signals at least partially overlap.
Figure 9:
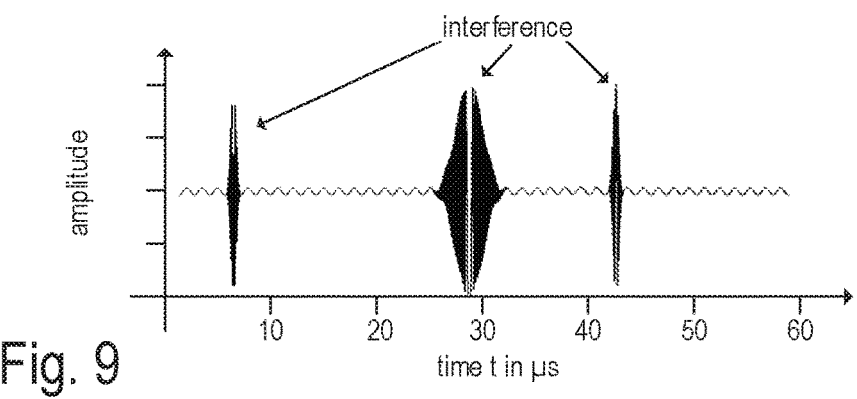
FIG. 9 illustrates one example waveform including a radar signal (after down-conversion to the base band) including a radar echo from a target and interference shown in FIG. 8.

FIGS. 8 and 9 illustrate, by way of example, how an interferer may disturb the radar echoes included in the signal $y_{RF}(t)$ received by a radar sensor. FIG. 8 illustrates frequency over time of one chirp (chirp duration 60 μs) radiated by a radar sensor. The start frequency of the radiates signal $s_{RF}(t)$ is approximately 76250 MHz and the stop frequency is approximately 76600 MHz. An interference signal $y_{RF,I}(t)$ generated from another radar sensor includes an up-chirp starting at approximately 76100 MHz and stopping at 76580 MHz (chirp duration 30 μs) and a subsequent down-chirp starting at the stop frequency of the preceding up-chirp (76580 MHz) and stopping at the start frequency of the next up-chirp (76100 MHz) with a chirp duration of 10 μs. The bandwidth B of the base band signal of the radar sensor, which is substantially determined by the base-band signal processing chain 20 (particularly by filter 21 shown in FIG. 4), is indicated in FIG. 8 by the dashed lines. FIG. 9 illustrates an example waveform of the (pre-processed) base band signal y(t) resulting from the interference signal $y_{RF,I}(t)$ down-converted to the base-band in the radar sensor. One can see that the signal components due to the interference have a significant magnitude in those time intervals in which the frequency of the interference signal is within the bandwidth B of the radar sensor (see FIG. 8). In the present example, the interference occurs three times during the 60 μs chirp duration, namely at approximately 7 μs, 28 μs and 42 μs. As mentioned, the power of interference signals is usually higher than the power of radar echoes from real targets. Further, interference signals and the transmit signal of a specific radar sensor are usually uncorrelated and thus the interference can be regarded as noise and increases the overall noise floor.

Figure 10:
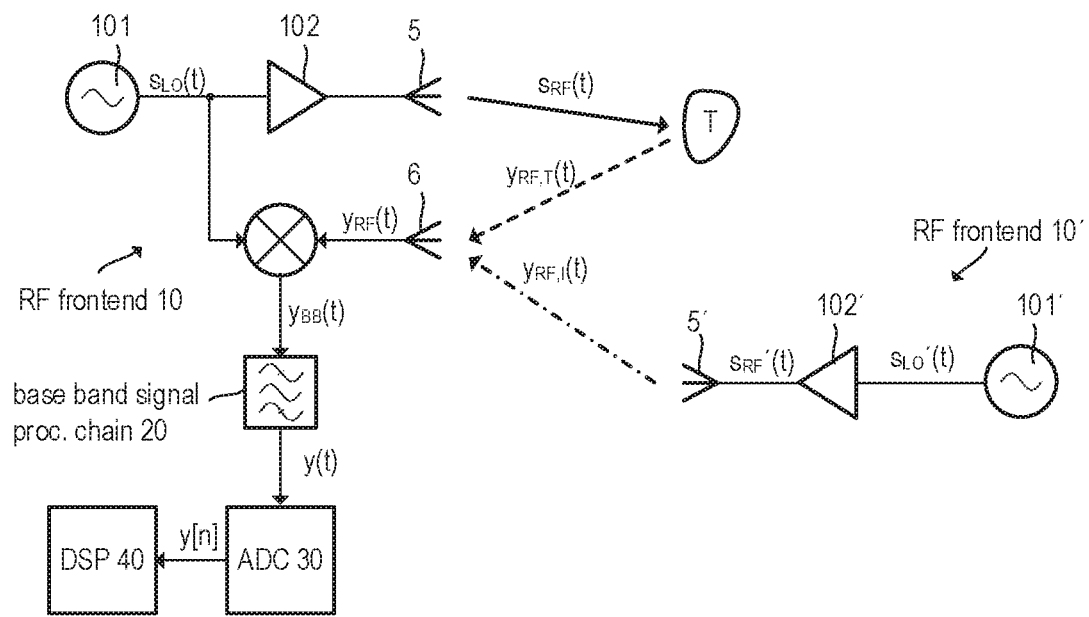
FIG. 10 is a circuit diagram illustrating one example of an analog RF frontend of a radar sensor and an analog RF frontend of an interferer.

FIG. 10 illustrates by means of block diagrams how an interference signal $y_{RF,I}(t)$ is down-converted to the base band and superposes on radar echoes $y_{RF,T}(t)$ from real radar targets (cf. eqn. (2) to (4)). FIG. 10 illustrates the RF frontend 10 of a radar sensor as described before with reference to FIG. 4. Local oscillator 101 is configured to generate an oscillator signal $s_{LO}(t)$ that includes sequences of chirps, which are amplified (amplifier 102) and radiated as transmit signal $s_{RF}(t)$ via TX antenna 5. The signal back-scattered at target T and received by RX antenna 6 is denoted as $y_{RF,T}(t)$ (cf. equation (3), number of targets U is 1). Additionally, FIG. 10 illustrates the RF frontend 10' of a further radar sensor, which includes an LO oscillator 101' for generating an oscillator signal $s_{LO}'(t)$. The oscillator signal $s_{LO}'(t)$ also includes sequences of chirps (different from signal $s_{LO}(t)$) that are amplified (amplifier 102') and radiated by TX antenna 6' as interference signal $s_{RF}'(t)$. The interference signal arriving at antenna 6 of the first radar sensor is denoted as $y_{RF,I}(t)$ (cf. equation (4), number of interferers V is 1).

Both, the radar echo $y_{RF,T}(t)$ and the interference signal $y_{RF,I}(t)$ are received by the antenna 6 and superpose at the RF input of mixer 104. It can be seen from FIG. 10 that the interference signal component $y_{RF,I}(t)$ of the received signal $y_{RF}(t)$ is down-converted into the base band in the same way as radar echoes $y_{RF,T}(t)$ included in the received signal $y_{RF}(t)$. Accordingly, when the frequency difference between the instantaneous frequency $f_{LO}$ of the transmit signal and the instantaneous frequency of the received interference signal $y_{RF,I}(t)$ lies within the bandwidth B of the base-band signal processing chain 20, the interference will also be present in the digital signal y[n]. The remaining options are either to discard the samples of the affected chirps or to (at least partially) suppress the remaining interference by employing digital signal processing techniques.

Two approaches that aim at cancelling interference in the digital domain are time domain thresholding (TDT) and frequency domain thresholding (FDT). Both methods adaptively calculate a threshold which is used to discriminate radar echoes from real targets from interference. However, finding a threshold that allows a reliable discrimination between radar echoes and interference may be difficult in real-world scenarios. Furthermore, when using FDT, if the threshold is exceeded, the affected chirp (or the affected sample) will be discarded and ignored during further processing. Approaches using TDT only discard the affected part of a chirp. Examples of the signal processing approach described below allow (at least partial) interference suppression without the need of a threshold to discriminate radar echoes from interference.

Figure 11:
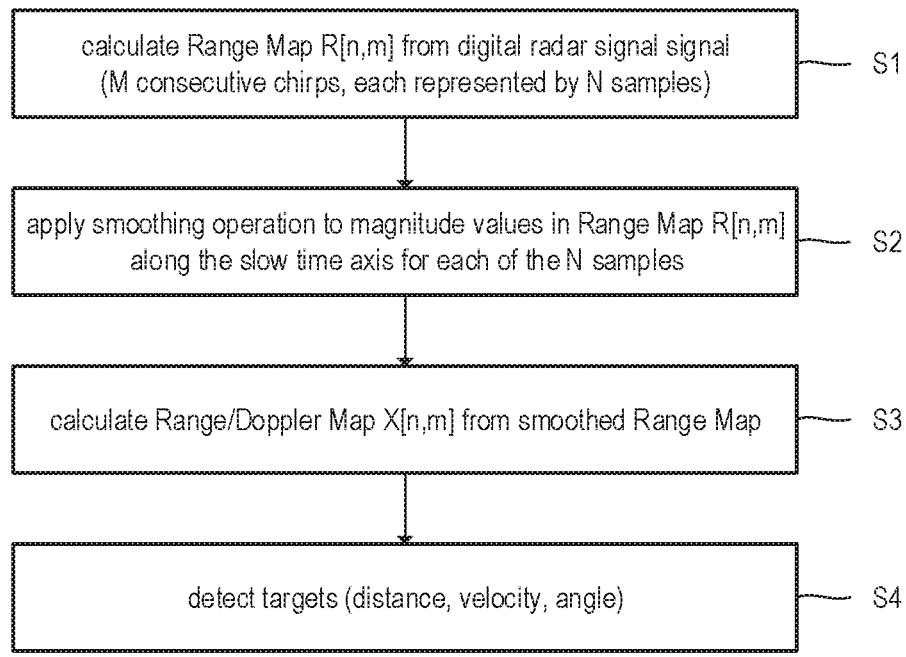
FIG. 11 is a flow chart illustrating one example implementation of a method for suppressing/reducing interference in a digital radar signal.

FIG. 11 is a flow chart illustrating one example method for suppressing or reducing interference in the digital domain, in particular based on a Range-Map R[n, m] obtained by sampling the digital (base band) radar signal y[n] (see FIGS. 4 and 10). In a first step S1 a Range Map R[n] is calculated from a digital radar signal y[n], which represents a sequence of a specific number of chirps. Without loss of generality, the number of chirps is denoted as M, and the sampling rate is chosen such that each chirp is represented by N samples. Accordingly, N×M samples of the digital radar signal y[n] are processed. As shown in FIG. 6, reference numbers (b) and (c), these samples can be arranged in an N×M matrix herein denoted as Y[n, m]. The Range Map R[n, m] may be obtained by applying an FFT to each of the M columns. The line index n of the Range Map R[n, m] represents the discrete frequency values (frequency bins) and the column index m represents the chirp number (or time values on the slow time axis).

As explained above with reference to FIG. 6, the M columns of the Range Map R[n, m] include the spectra of M segments of the digital radar signal y[n] representing the radar echoes caused by the chirps included in the transmitted RF signal $s_{RF}(t)$. That is, the matrix elements of the Range Map R[n, m] are complex-valued spectral values $\tilde{A}_{n,m}$, wherein each spectral value $\tilde{A}_{n,m}$ is associated with a specific frequency bin and a specific chirp number (or time value on the slow time axis). The complex values $\tilde{A}_{n,m}$ can be expressed as $$\tilde{A}_{n,m} = A_{n,m} \cdot e^{j \cdot \varphi_{n,m}} \text{ for } n=[0, \ldots, N-1] \text{ and } m=[0, \ldots, M-1], \quad (5)$$

wherein $A_{n,m}$ represents the magnitude, $\varphi_{n,m}$ represents the respective phase of the spectral value $\tilde{A}_{n,m}$, and j denotes the imaginary unit. As mentioned, n denotes a frequency bin and m the chirp number (equivalent to a time value $m \cdot T_{CHIRP}$ on the slow time axis). According to a more general approach, each complex-valued spectral value $\tilde{A}_{n,m}$ is represented by at least a first parameter, which may be the magnitude, the phase, the real part or the imaginary party or any other parameter (e.g. the exponential function $e^{j \varphi_{n,m}}$) suitable to represent a complex value.

Again referring to the flow chart of FIG. 11, a smoothing operation is applied on the sequence of first parameters (e.g. magnitudes $(A_{n,0}, A_{n,1}, \ldots, A_{n,m}, \ldots, A_{n,M-1})$) for at least one, for some or for all frequency bins n of the Range Map (FIG. 11, step S2, n=0, ..., N−1). In other words, the smoothing operation is applied to at least one line (or, line by line, to each line) of the Range Map R[n, m], wherein the smoothing operation may be a non-linear operation and only affect the magnitude values $A_{n,m}$ but leave the phase values $\varphi_{n,m}$ unchanged (in case the first parameters are the magnitudes and the second parameters are the phases). In particular, the non-linear smoothing operation may be a thresholdless (threshold free) operation, i.e. an operation which uses only the values to be smoothed as input data and does not use a threshold for the smoothing. This approach distinguishes the examples described herein with common thresholding techniques. Using a smoothing operation instead of a conventional thresholding technique may also result in a reduction of noise. Furthermore, using a (threshold free) smoothing operation basically eliminates the problem of how to set an appropriate threshold.

In step S3, the Range Doppler/Map X[n, m] may be calculated from the smoothed Range Map in a particular manner (see FIG. 6), and target detection (distance, velocity) may be done based on the Range Doppler/Map X[n, m] using any known algorithm (step S4). As mentioned, each frequency bin n corresponds to a specific range/distance value. In the following examples, the first parameters are the magnitudes of the spectral values in the Range Map and the phase may be regarded as second parameters. It is noted, however, that the present disclosure is not limited to the smoothing of magnitudes.

Figures 12, 13:
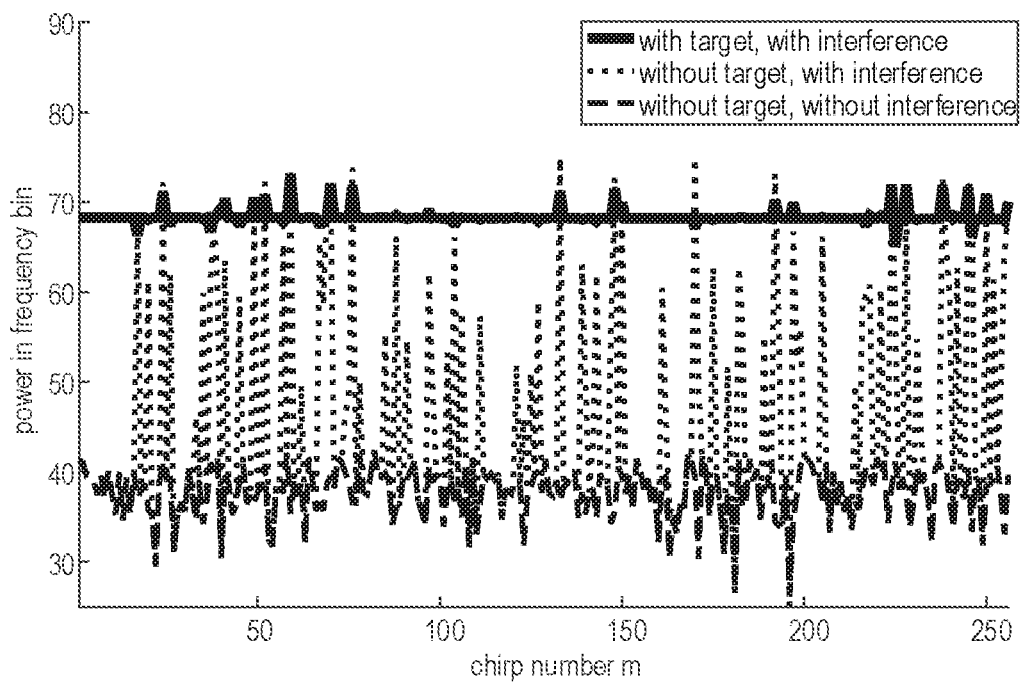
FIG. 12 illustrates the structure of a Range Map.
FIG. 13 illustrates one example waveform showing the signal power over time for frequency bins including noise only, noise and a radar echo, and noise and interference.

In the following, the smoothing operation is discussed in more detail. FIG. 12 illustrates a Range Map R[n, m], whose lines include the input data for the smoothing operation. It is noted that only the magnitudes $A_{n,m}$ are shown in the FIG. 12 in order to keep the illustration simple. Before discussing the smoothing operation in more detail, the magnitude values $A_{n,m}$ in the Range Map R[n, m] are analyzed for a specific example, which has been obtained by simulation. The waveforms shown in FIG. 13 represent the magnitude values $A_{n1,m}$, $A_{n2,m}$, and $A_{n2,m}$ for three different frequency bins $n_1$, $n_2$, and $n_3$, respectively (i.e. three different lines of R[n, m]). In the present example the number of chirps M is 256 (m=0, ..., 255).

In FIG. 13, the dashed line represents the sequence $R[n_3, m] = (A_{n3,0}, A_{n3,1}, \ldots, A_{n3,255})$ associated with frequency bin $n_3$. The magnitudes (corresponding to the signal power) in this frequency bin $n_3$ basically include only noise but no radar echo and no interference. Thus, the sequence $R[n_3, m]$ basically represents the noise floor (i.e. is one realization of the noise-only signal). The solid line represents the sequence $R[n_1, m] = (A_{n1,0}, A_{n1,1}, \ldots, A_{n1,255})$ associated with frequency bin $n_1$; the magnitudes in this frequency bin $n_1$ basically include noise and a radar echo from a real radar target. The distance $d_T$ of the target can be determined in accordance with equation (1), wherein the beat frequency $\Delta f$ is given by the frequency bin $n_1$. As can be seen in FIG. 13, the signal magnitude (power) caused by a radar target is significantly above the noise floor and approximately the same for all 255 chirps. That is, the sequence $R[n_1, m]$ is basically a flat horizontal line with only small fluctuations due to noise and interference. The dashed line represents the sequence $R[n_2, m] = (A_{n2,0}, A_{n2,1}, \ldots, A_{n2,255})$ associated with frequency bin $n_2$; the magnitudes in this frequency bin $n_2$ basically include noise and interferences but no radar echo. As can be seen in FIG. 13, the signal magnitude (power) caused by interference may be significantly above the noise floor but usually will vary greatly over the 255 chirps. For some chirps (e.g. m≈0 to 9, or m≈120, m≈150 to 160, etc.), the signal power may be close to the noise floor, whereas for other chirps the signal power may be similar to the signal power of a radar echo or even higher.

To summarize the above, the three curves in the diagram of FIG. 13 visualize a "section" through the columns of a Range Map at specific discrete frequency values (frequency bins); these sections show signal magnitude/power in the respective frequency bin over the slow time axis (chirp number). A radar echo will manifest itself as a (local) peak that does not significantly vary along the slow time axis. That is, substantially the same peak power will appear in all chirps at the relevant frequency bin. Differently, an interference signal will also manifest itself as a peak; however, this peak varies greatly along the slow time axis. That is, the signal power due to interference will usually not evenly appear in all chirps at the relevant frequency bin.

Figure 14:
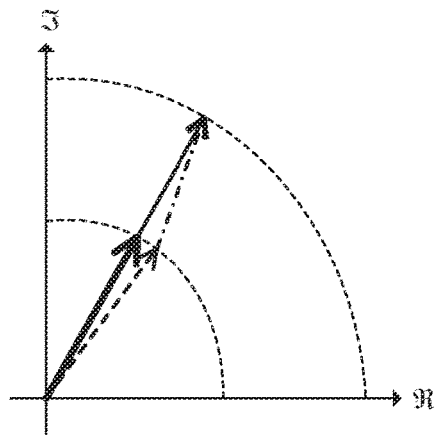
FIG. 14 illustrates the smoothing of the magnitudes included in the Range Map of FIG. 12.

FIG. 14 illustrates two examples of how interference can be suppressed or at least reduced by applying the above-mentioned smoothing operation to the lines of a Range Map R[n, m]. According to reference (a) of FIG. 14, a smoothing operation is—for each frequency bin—applied to the magnitudes of the spectral values along the slow time axis. In other words, for each frequency bin the magnitudes of the spectral values associated with the M consecutive chirps are smoothed to reduce the strong fluctuations due to interference (see FIG. 13, dashed curve). The smoothing operation may be a non-linear operation, which is configured to reduce strong fluctuations along the slow time axis (due to interference) but does not significantly affect radar echoes from real targets as these usually cause a local signal maximum that is substantially constant along the slow time axis (see FIG. 13, solid curve).

Accordingly, the smoothing operation can be written as a function $$\text{smooth}: \mathbb{R}^M \to \mathbb{R}^M, (A_{n,0}, A_{n,1}, \ldots, A_{n,M-1}) \to (A'_{n,0}, A'_{n,1}, \ldots, A'_{n,M-1}), \quad (6)$$

which maps the magnitude values $(A_{n,0}, A_{n,1}, \ldots, A_{n,M-1})$ at a specific frequency bin n to the smoothed magnitude values $(A'_{n,0}, A'_{n,1}, \ldots, A'_{n,M-1})$. In one simple example, the smoothing operation may be the minimum operation $\min(\cdot)$. In this case the smoothing operation can be written as:

$$\text{smooth}: \mathbb{R}^M \to \mathbb{R}^M, (A_{n,0}, A_{n,1}, \ldots, A_{n,M-1}) \to (A_{n,min}, A_{n,min}, \ldots, A_{n,min}), \quad (7)$$

wherein $A_{n,min} = \min(A_n, A_{n,1}, \ldots, A_{n,M-1})$. In other words, at each frequency bin n=0, 1, ... N−1, the magnitudes $A_{n,m}$ are replaced by the minimum $A_{n,min}$. This example is illustrated in reference (b) of FIG. 14.

As mentioned above, the smoothing operation used in connection with the embodiments described herein does not use a threshold (to which the magnitude values can be compared) and thus avoids the problem of how to appropriately set the threshold. If a particular magnitude value $A_{n,m}$ is modified by the smoothing operation, then the corresponding modified (i.e. smoothed) magnitude value $A'_{n,m}$ depends on one or more of the magnitude values in the same frequency bin n and is not modified to a fixed or preset value (e.g. setting a value to zero if a threshold condition is met). In the example of equation 7, the minimum value in the current frequency bin is used. Furthermore, by modifying a particular magnitude value $A_{n,m}$ based on one or more of the magnitude values in the same frequency bin n it can be achieved that the particular magnitude value $A_{n,m}$ is variable and not set to a predefined constant value such as zero. Therefore, the smoothing operation as described above may result in a reduction of noise and better interference mitigation.

It is understood that, although the minimum operation yields good results when applied to simulated data (simulated Range Map including simulated radar echo and interference), other smoothing operations may yield better results when applied to measured data from real radar targets and interferers. Other suitable smoothing operations may be, inter alia, averaging, moving average filter, median filter, minimum operation in a sliding window (moving minimum) or the like. Two or more smoothing operations may be combined to obtain further suitable smoothing operations. In case of a median filter the values $A'_{n,m}$ in equation (6) can be calculated as, $$A'_{n,m} = \text{median}(A_{n,m-w}, A_{n,m-w+1}, \ldots, A_{n,m-1}, A_{n,m}, A_{n,m+1}, \ldots A_{n,m+w}), \quad (8)$$

wherein 2w+1 is the window size of the median filter, and wherein indices lower than 0 and greater than M−1 are replaced by 0 and M−1, respectively. With an example window size of 7 (w=3), equation (8) yields $$A'_{n,m} = \text{median}(A_{n,m-3}, A_{n,m-2}, A_{n,m-1}, A_{n,m}, A_{n,m+1}, A_{n,m+2}, A_{n,m+3}). \quad (9)$$

As can be seen from equations 8 and 9, the non-linear smoothing filter generally modifies all magnitude values in the considered frequency bin. Even in case of a minimum filter, practically all magnitude values are modified (except a single value in a frequency bin that is the minimum).

As mentioned, the smoothing operation does not affect the phase values $\varphi_{n,m}$. Accordingly, the smoothed Range Map R'[n, m] is composed of the smoothed magnitude values $A'_{n,m}$ and the original phase values $\varphi_{n,m}$. That is $$R'[n,m] = A'_{n,m} \cdot e^{j \varphi_{n,m}} \text{ for } n=1, \ldots N-1 \text{ and } m=1, \ldots M-1 \quad (10)$$

The smoothed Range Map R' [n, m] can be further processed in any particular manner, e.g. by applying the second stage of FFTs to the lines of the Range Map R' [n, m] in order to obtain the Range-Doppler Map X[n,m], which allows, inter alia, detection of target velocities. Target detection and classification may be done based on the Range-Doppler Map X[n,m] using known algorithms. Before each FFT stage, a windowing operation may be applied. Such a windowing operation is known to a person skilled in the art and no further details are discussed in this regard.

According to the examples described herein, only the magnitudes $A_{n,m}$ in the Range Map R[n,m] are smoothed, whereas the phase terms $e^{j\varphi_{n,m}}$ are left unchanged. This allows to proceed with Range/Doppler processing to determine the velocities of the detected targets. It is noted that the concept of smoothing the magnitudes $A_{n,m}$ in the Range Map R[n,m] does not exclude an additional manipulation/correction of the phase terms $e^{j\varphi_{n,m}}$.

Figure 15:
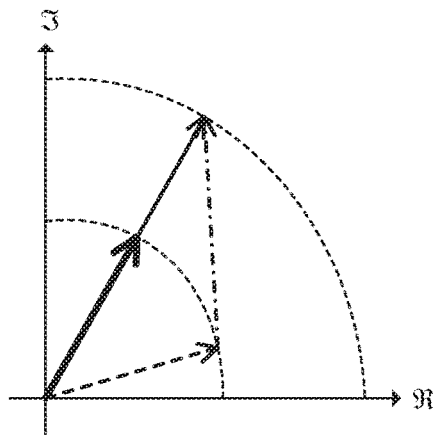
FIG. 15 illustrates examples of how the phase of the spectral values included in the Range Map of FIG. 12 may be distorted due to interference.

However, interference does not only affect the magnitudes $A_{n,m}$, but also the phase values. For a comparably low interference signal power (e.g. when the interference power does not significantly exceed the power of the radar echoes) the deterioration of the phase term $e^{j\varphi_{n,m}}$ due to interference may lead to a negligible measurement error in the target velocities. However, for higher interference signal power (e.g. when the interference power t significantly exceeds the power of the radar echoes) the deterioration of the phase term $e^{j\varphi_{n,m}}$ due to interference may lead to a significant corruption of the velocity measurement. This situation is illustrated in FIG. 15. References (a) and (b) of FIG. 15 illustrate the superposition of the complex-valued radar echo and interference signals as well as the effect of interference suppression according to the examples described herein. In the case shown in reference (a), the interference only slightly deteriorates the phase of the radar echo signal from the target, which leads to a small phase error between the undistorted radar echo signal and the radar echo signal after interference suppression. In the case shown in reference (b), the interference significantly deteriorates the phase of the radar echo signal from the target, thus leading to a large phase error. In view of the above, the interference suppression approach as described herein is particularly suitable for short range radar applications (radar sensors with a comparably short measurement range, e.g. up to 10 m) in which the signal power of the radar echoes is comparably high. Existing thresholding approaches may be used alternatively or additionally in long range radar applications (radar sensors with a comparably high measurement range, e.g. 10-200 m). Particularly a combination of the interference suppression approach described herein with known thresholding techniques such as TDT or FDT seems to be useful for both short-range and long-range radar applications.

As mentioned above, the smoothing operation is applied line by line to the Range Map along the slow time axis (or column by column if a transposed representation is used), i.e. the smoothing operation is applied to the magnitudes of the spectral values in a specific frequency bin for each chirp. Accordingly, the magnitudes of the spectral values in a specific frequency bin can be regarded as a time-discrete signal and a least some of the mentioned smoothing operations can be regarded as mathematical operations such as time-discrete filters (e.g. median filter). The concept of time-discrete filtering along the slow time axis may be generalized, and accordingly a mathematical operation such as filtering is not (or not only) used for smoothing the signal but also to analyze the Range Map (or at least a portion thereof), e.g. to detect the presence of interference. Particularly filters that use sliding windows may be used such as, for example, a (one-dimensional) variance filter. Similar to equation (6) such a sliding window operation SWO may be written as $$\text{SWO}: \mathbb{R}^M \to \mathbb{R}^M, (A_{n,0}, A_{n,1}, \ldots, A_{n,M-1}) \to (A'_{n,0}, A'_{n,1}, A'_{n,M-1}), \quad (11)$$

wherein, in the case of a variance filter, the filtered values $A'_{n,m}$ may be calculated as $$A'_{n,m} = \frac{1}{2w+1} \sum_{i=-w}^{w} (A'_{n,m+i} - \overline{A}_{n,m})^2. \quad (12)$$

In equation (12) the length of the sliding window is again 2w+1 and $\overline{A}_{n,m}$ is the (moving) average for the current window position. In the event that, for a discrete time value on the slow time axis (chirp number), the variance exceeds a given threshold value, presence of interference is detected in the respective chirp. The threshold comparison may be included in the sliding window operation; in this case the sliding window operation may output either 0 or 1 dependent on whether the calculated variance is above the threshold or not. In this example, the operation D[n, m]=SWO(R [n, m]) may result in a detection matrix including only Boolean values (e.g. 0 and 1) indicating, whether interference is present for a specific frequency bin (range) and a specific chirp.

This interference detection may be done before the smoothing operation and those chirps, in which interference has been detected, may be digitally communicated to a superordinate (higher level) controller to signal that measurements based on those chirps may be unreliable. It is understood that interference detection may be done without a subsequent smoothing. Although the sliding window operation SWO according to equation (11) is a real valued operation, other sliding window operations may be applicable, which are defined for complex input values. In that case, the sliding window operation may be applied not only to the magnitudes but rather to the complex-valued spectral values in the Range Map R[n,m].

Figure 16:
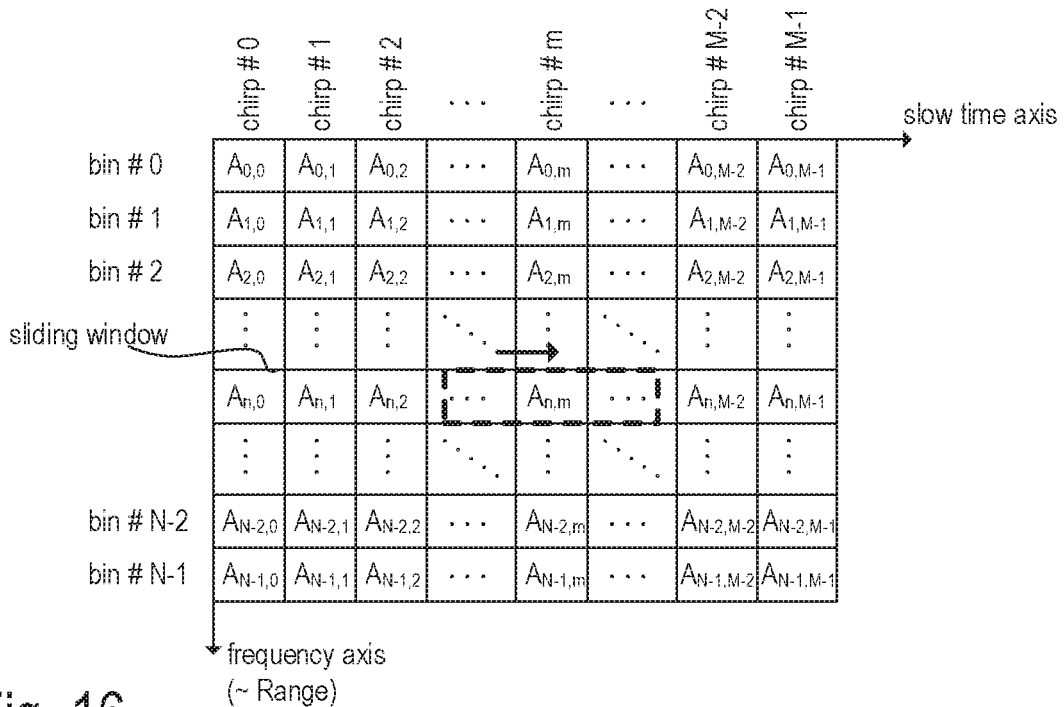
FIG. 16 illustrates how a sliding window operation may be applied to a Range Map along the slow time axis for detection of the presence of interference.

The variance filter is only one example of a so-called sliding window statistics. Other examples of sliding window statistics are the above-mentioned moving minimum operation, moving root-mean-square operation, standard deviation filter, etc. It is understood, that some sliding window operations (e.g. median filter, moving minimum operation, etc.) may be used for smoothing as explained above and other may be used for detection of the presence of interference. A general example of the application of a sliding window operation to a Range Map R[n, m] is illustrated in FIG. 16, in which the sliding window is illustrated by the dashed line and the moving direction of the sliding window is indicated with an arrow. It is understood that the same sliding window operation may be applied for each frequency bin in the same manner, e.g. according to equations (11) and (12).

Figure 17:
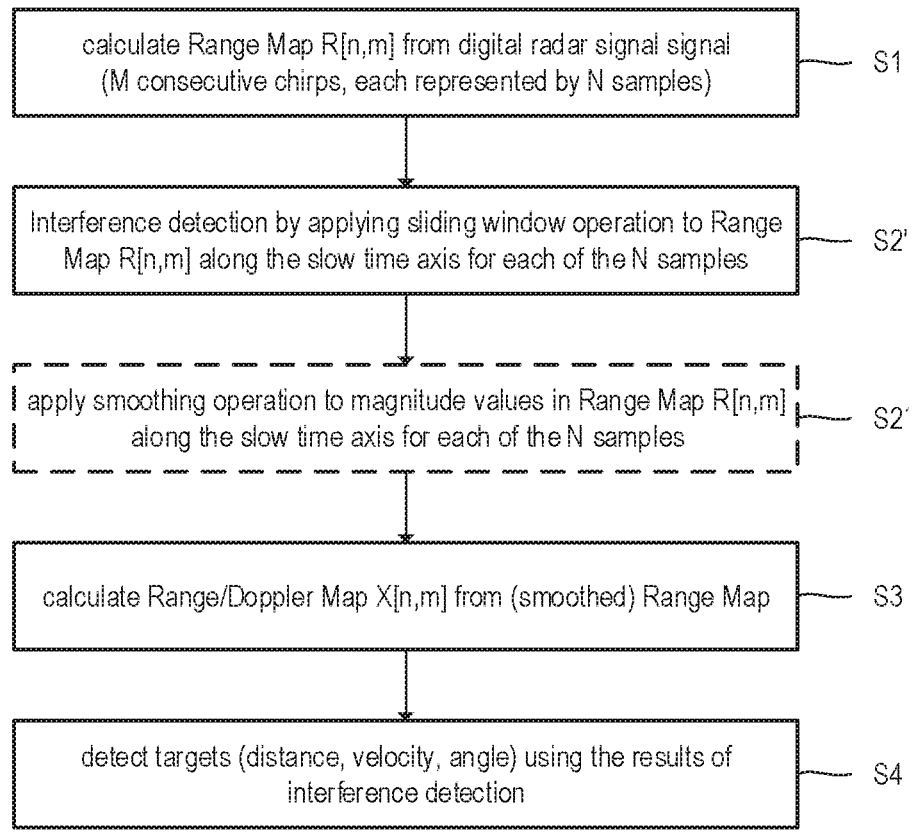
FIG. 17 is a flow chart illustrating one example implementation of interference detection using sliding windows statistics.

FIG. 17 is a flow chart illustrating the interference detection explained above. As in the previous example of FIG. 11, a Range Map R[n] is calculated (e.g. using an FFT algorithm) from a digital radar signal y[n], which represents a sequence of a specific number of chirps, in a first step S1. N×M samples of the digital radar signal y[n] are processed in this step. As shown in the example of FIG. 16, the line index n of the Range Map R[n, m] represents the discrete frequency values (frequency bins), which correspond to Range values, and the column index m represents the chirp number (i.e. discrete time values on the slow time axis). An operation such as, e.g., a sliding window operation may be applied to the Range Map R[n, m] for each frequency bin along the slow time axis (step S2'). The output of the sliding window operation may be, for example, sliding window statistics, based on which the presence of interference may be detected. In one example, the sliding window operation may include the calculation of a statistical parameter for a specific window position, comparing the statistical parameter with a threshold, and outputting a value indicative of whether the statistical parameter exceeds the threshold (due to interference). At this point, it is noted that the (e.g. sliding window) operation is threshold free like the smoothing discussed further above. Only the results of the operation may be compared to a threshold in order to detect the presence of interference. Accordingly, the output of the sliding window operation may be a sequence of Boolean values (e.g. 0 and 1) indicating whether interference has been detected for a specific frequency bin (range) and a specific chirp (or group of chirps). Optionally (drawn in dashed lines), a smoothing operation may be applied to smooth the Range Map as explained above (step S2), wherein the sliding window operation is applied to the unsmoothed Range Map. Finally, the Range/Doppler Map X[n, m] may be calculated from the Range Map or the smoothed Range Map (step S3), and the target detection (e.g. detection of distance, speed, angle) may be performed based on the Range/Doppler Map (step S4). The results of the interference detection (Step S2') may be used for the target detection, e.g. to assess the reliability of the target detection and the related position (distance and angle) and speed measurements.

Finally it is noted that the mathematical representation of the Range Map R[n,m] used herein has to be regarded as an example and may be chosen differently in other implementations. For example, the matrix representation of the Range Map R[n,m] as well as of the Range/Doppler Map X[n,m] may be transposed. Furthermore, the two-dimensional representation may be converted in a one-dimensional representation dependent on the system (processor, software development tools, etc.) that is used to implement the examples described herein. The processor performing the FFT operations and smoothing operations described above may be integrated in the MMIC or arranged in a separate chip that may be arranged on the same circuit board or in the same radar module as the MMIC(s) which include the HF frontend(s).

Although the present disclosure has been illustrated and described with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond—unless otherwise indicated—to any component or structure, which performs the specified function of the described component (e.g., that is functionally equivalent), even though not structurally equivalent to the disclosed structure, which performs the function in the herein illustrated example implementations of the present disclosure.

What is claimed is:

1. A method performed by a radar device, the method comprising:
    calculating a Range Map based on a digital radar signal received from a radar receiver,
        wherein the Range Map includes spectral values for a plurality of discrete frequency values and a plurality of discrete time values,
            wherein each of the spectral values is represented by at least a firstone parameter,
        wherein the digital radar signal includes at least M consecutive segments of N samples,
            wherein each segment of the at least M consecutive segments have a corresponding chirp in a sequence of chirps and are associated with one of the plurality of discrete time values, and
        wherein calculating the Range Map comprises:
            applying a Discrete Fourier Transform to each segment of the at least M consecutive segments resulting in N spectral values for each segment of the at least M consecutive segments,
                wherein M and N are integer numbers; and
    smoothing, for at least one discrete frequency value of the plurality of discrete frequency values, the at least one parameter.

2. The method of claim 1, wherein the at least one parameter is a magnitude of a respective one of the spectral values;
    wherein magnitudes in the Range Map represent time-discrete sequences;
    wherein each time-discrete sequence of the time-discrete sequences is associated with a respective discrete frequency; and
    wherein smoothing the at least one parameter comprises:
        applying a smoothing operation to a respective time-discrete sequence.

3. The method of claim 2, wherein smoothing the at least one parameter comprises:
    smoothing the magnitudes in the Range Map and leaving phases of the spectral values unchanged.

4. The method of claim 1, wherein smoothing the at least one parameter comprises:
    applying a non-linear threshold free smoothing operation.

5. The method of claim 4, wherein the non-linear threshold free smoothing operation comprises, for each discrete frequency value of the plurality of discrete frequency values, a non-linear filtering of the at least one parameter.

6. The method of claim 4, wherein the non-linear threshold free smoothing operation further comprises at least one of:
    a minimum operation,
    an averaging operation,
    a sliding window operation,
    a moving average filter operation,
    a median filter operation, or
    a moving minimum operation.

7. The method of claim 1, further comprising:
    generating a radio frequency (RF) oscillator signal including the sequence of chirps;
    transmitting the RF oscillator signal via a transmission antenna;
    receiving an RF radar signal via a reception antenna based on transmitting the RF oscillator signal; and
    providing the digital radar signal based on the RF radar signal.

8. The method of claim 1, further comprising:
    calculating a Range/Doppler Map based on the Range Map after smoothing the at least one parameter; and
    detecting radar targets based on data included in the Range/Doppler Map.

9. The method of claim 8, wherein detecting the radar targets comprises:
    detecting one or more of:
        a distance of the radar targets,
        a speed of the radar targets, or
        an angle of the radar targets.

10. The method of claim 1, wherein smoothing the at least one parameter comprises:
    modifying, for the at least one discrete frequency value, a plurality of parameters,
        wherein, if a particular parameter of the plurality of parameters is modified, the particular parameter depends on one or more other parameters associated with the at least one discrete frequency value.

11. A method performed by a radar device, the method comprising:
    calculating a Range Map based on a digital radar signal received from a radar receiver,
        wherein the Range Map includes spectral values for a plurality of discrete frequency values and a plurality of discrete time values,
        wherein each of the spectral values is represented by at least one parameter,
        wherein the digital radar signal includes at least M consecutive segments of N samples,
        wherein each segment of the at least M consecutive segments have a corresponding chirp in a sequence of chirps and are associated with one of the plurality of discrete time values, and
        wherein calculating the Range Map comprises:
            applying a Discrete Fourier Transform to each segment of the at least M consecutive segments resulting in N spectral values for each segment of the at least M consecutive segments,
            wherein M and N are integer numbers; and
    applying an operation to the at least one parameter for at least one discrete frequency value of the plurality of discrete frequency values;
    calculating a Range/Doppler Map based on the Range Map; and
    performing radar target detection based on the Range/Doppler Map and using a result of the operation.

12. The method of claim 11, wherein the operation is a sliding window operation, and/or
    wherein the operation includes sliding window statistics.

13. The method of claim 12, wherein the sliding window operation includes at least one of:
    a variance filter operation,
    a standard deviation filter operation, or
    a moving root-mean-square operation.

14. The method of claim 12, wherein the sliding window operation includes a calculation of a statistical parameter for a specific window, comparing the statistical parameter with a threshold, and outputting a value indicative of whether the statistical parameter exceeds the threshold.

15. The method of claim 11, further comprising:
    smoothing, for the at least one discrete frequency value and using a threshold free smoothing operation, the at least one parameter before calculating the Range/Doppler Map.

16. The method of claim 11, wherein the result of the operation is indicative of a presence of interference.

17. A radar device comprising:
    a radar receiver configured to provide a digital radar signal; and
    a processor configured to:
        calculate a Range Map based on the digital radar signal,
            wherein the Range Map includes spectral values for a plurality of discrete frequency values and a plurality of discrete time values,
            wherein the spectral values are represented by at least one parameter,
            wherein the digital radar signal includes at least M consecutive segments of N samples,
                wherein each segment of the at least M consecutive segments have a corresponding chirp in a sequence of chirps and are associated with one of the plurality of discrete time values, and
            wherein the processor, when calculating the Range Map, is configured to:
                apply a Discrete Fourier Transform to each segment of the at least M consecutive segments resulting in N spectral values for each segment of the at least M consecutive segments,
                    wherein M and N are integer numbers; and
        smooth, for at least one discrete frequency value of the plurality of discrete frequency values, at least the one parameter.

18. The radar device of claim 17, wherein the at least one parameter is a magnitude of a spectral value of the spectral values, and/or
   wherein the at least one parameter is smoothed for each discrete frequency value of the plurality of discrete frequency values.

19. A radar device comprising:
   a radar receiver configured to provide a digital radar signal;
   a processor configured to:
      calculate a Range Map based on the digital radar signal,
         wherein the Range Map includes spectral values for a plurality of discrete frequency values and a plurality of discrete time values,
            wherein the spectral values are represented by at least one parameter,
         wherein the digital radar signal includes at least M consecutive segments of N samples,
            wherein each segment of the at least M consecutive segments have a corresponding chirp in a sequence of chirps and are associated with one of the plurality of discrete time values, and
         wherein the processor, when calculating the Range Map, is configured to:
            apply a Discrete Fourier Transform to each segment of the at least M consecutive segments resulting in N spectral values for each segment of the at least M consecutive segments,
               wherein M and N are integer numbers;
      apply, for one or more spectral values corresponding to at least one discrete frequency value of the plurality of discrete frequency values, an operation to the at least one parameter;
      calculate a Range/Doppler Map based on the Range Map; and
      perform radar target detection based on the Range/Doppler Map and using a result of the operation.

20. The radar device of claim 19, wherein the operation is a sliding window operation, and/or
   wherein the operation includes sliding window statistics.

21. The radar device of claim 19, wherein the at least one parameter is a magnitude of the spectral values, and/or
   wherein the operation is applied for each discrete frequency value of the plurality of discrete frequency values.

22. The radar device of claim 19, wherein the result of the operation is indicative of a presence of interference.

23. The radar device of claim 19, wherein the processor is further configured to:
   smooth, for the at least one discrete frequency value and using a threshold free smoothing operation, the at least one parameter before calculating the Range/Doppler Map,
      wherein the operation is applied to the at least one parameter before the at least one parameter is smoothed.

* * * * *

UNITED STATES PATENT AND TRADEMARK OFFICE
CERTIFICATE OF CORRECTION

PATENT NO. : 10,969,463 B2
APPLICATION NO. : 16/157252
DATED : April 6, 2021
INVENTOR(S) : Alexander Melzer et al.

Page 1 of 1

It is certified that error appears in the above-identified patent and that said Letters Patent is hereby corrected as shown below:

Claim 1:
Column 16, Line 52, change "at least a firstone parameter" to --at least one parameter--

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*